United States Patent [19]
Warren et al.

[11] Patent Number: 6,118,807
[45] Date of Patent: *Sep. 12, 2000

[54] METHODOLOGY FOR RECEIVED SIGNAL ENHANCEMENT UTILIZING DELAY DIVERSITY PROCESSING

[75] Inventors: Bruce G. Warren, Poulsbo; Alan F. Jovanovich, Des Moines, both of Wash.; Frank J. Pergal, Los Angeles, Calif.

[73] Assignee: Intermec IP Corp., Woodland Hills, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/535,947

[22] Filed: Sep. 28, 1995

(Under 37 CFR 1.47)

Related U.S. Application Data

[63] Continuation-in-part of application No. 08/363,712, Dec. 23, 1994, abandoned.

[51] Int. Cl.⁷ .............................. A61F 2/06; H04L 27/30
[52] U.S. Cl. ........................................... 375/150; 375/142
[58] Field of Search ..................... 375/206, 343, 375/347, 267, 200, 349, 208, 142, 143, 140, 150; 370/517; 327/167, 336, 392, 142, 161; 364/829, 733; 365/154

[56] References Cited

U.S. PATENT DOCUMENTS

| | | | |
|---|---|---|---|
| 4,387,465 | 6/1983 | Becker | 375/200 |
| 5,093,848 | 3/1992 | Raith | 375/97 |
| 5,230,013 | 7/1993 | Hanke et al. | |
| 5,237,587 | 8/1993 | Schoolcraft | 375/200 |
| 5,241,701 | 8/1993 | Andoh | |
| 5,263,180 | 11/1993 | Hirayama et al. | |
| 5,276,920 | 1/1994 | Kuisma | |
| 5,347,536 | 9/1994 | Meehan | |
| 5,408,504 | 4/1995 | Ostman | 375/354 |
| 5,412,620 | 5/1995 | Cafarella et al. | 367/134 |
| 5,422,908 | 6/1995 | Schilling | 375/203 |
| 5,535,237 | 7/1996 | LaPadula, III et al. | 375/200 |
| 5,633,889 | 5/1997 | Schilling | 375/203 |

Primary Examiner—Tesfaldet Bocure
Assistant Examiner—Jean B. Corrielus
Attorney, Agent, or Firm—O'Melveny & Myers LLP

[57] ABSTRACT

A delay diversity processor for use in receiving direct sequence spread spectrum data utilizes multipath signals to enhance bit synchronization performance by integrating the magnitude of each multipath signal to allow for erratic fluctuations in the multipath signal. As a result, the receiver is less prone to sudden signal strength variation that might trigger erroneous bit resynchronization. The delay diversity processor comprises a first circuit which determines a magnitude value for each of a plurality of correlated signal samples of individual data bits of plural data streams of the received spread spectrum data. A second circuit integrates each of the magnitude values over a period of time corresponding to receipt of a plurality of the individual data bits. The integrated magnitude values provide a measure of confidence of a particular one of the correlated signal samples with respect to remaining ones of the correlated signal samples. The correlated signal sample having the most consistently high measure of confidence is thus most likely to contain reliable and valid data. In an embodiment of the delay diversity processor, the digital delay circuit of the second circuit provides for resetting of the integrated magnitude values within following interruption of receipt of the spread spectrum data. The data values within the digital delay circuit can be reset either to zero, or to a predetermined value. The use of a predetermined value improves the ability of the delay diversity processor to generate valid data following an interruption of the spread spectrum data.

34 Claims, 4 Drawing Sheets

METHODOLOGY FOR RECEIVED SIGNAL ENHANCEMENT UTILIZING DELAY DIVERSITY PROCESSING

RELATED APPLICATION

The present application is a continuation-in-part of copending application Ser. No. 08/363,717, filed Dec. 23, 1994, for METHODOLOGY FOR RECEIVED SIGNAL ENHANCEMENT UTILIZING DELAY DIVERSITY PROCESSING, now abandoned.

BACKGROUND OF THE INVENTION

1. Field of the Invention

The present invention relates to radio receivers for direct sequence spread spectrum communications, and more particularly, to a radio system utilizing digital signal processing techniques that enhance receiver performance for operation in a multipath rich environment.

2. Description of Related Art

All radio systems are susceptible to a phenomenon known as multipath transmission. Ideally, a radio signal travels along a direct path between a transmitter and a receiver. In practice, however, the radio signal takes a less direct path resulting from reflection of the signal off of objects disposed between the transmitter and the receiver. Indoor radio systems within residential, office and industrial structures are particularly prone to multipath reflections due to the greater number of reflective surfaces disposed within the environment. The multipath transmissions tend to degrade overall performance of the radio system, since the desired signal becomes obscured by the numerous time-delayed versions of the original signal presented to the receiver. As a result, the operational range of the radio system is decreased.

The simplest technique for coping with multipath transmission is to isolate the strongest radio signal from the various multipath signals. The magnitude of a received signal from each path is a function of the distance traveled, the amount of signal power reflected off of each surface, and the relative antenna polarity. Generally, the radio receiver will lock onto the signal having the greatest magnitude, and treat the other multipath signals as noise which is simply filtered out by the radio receiver. This technique is easy to implement but not ideal because it tends to reduce the sensitivity of the radio system by increasing the threshold level for distinguishing noise, which reduces the effective operational range of the radio system.

More sophisticated radio systems utilize antenna diversity techniques for selecting between signals received at each of a plurality of antennas. The electric field levels received by each antenna are integrated over a pre-determined period of time to select the antenna with the highest time integrated value as the true signal source. Examples of radio systems utilizing antenna diversity are disclosed in: (a) U.S. Pat. No. 5,263,180 to Hirayama et al. for SPACE DIVERSITY RECEPTION SYSTEM; (b) U.S. Pat. No. 5,276,920 to Kuisma for ANTENNA SELECTION SWITCH FOR A DIVERSITY ANTENNA; and (c) U.S. Pat. No. 5,241,701 to Andoh for ANTENNA SELECTING DIVERSITY RECEIVING APPARATUS. While the selection between antennas improves performance of the radio system, the multipath signal is still present on the selected antenna and is treated as an interfering noise source. Thus, the receiver sensitivity must still be reduced to minimize the effects of the multipath signal which appears as noise, reducing the effective operational range of the radio system.

Spread spectrum modulation techniques are increasingly popular for communications, navigation, radar and other applications. In a spread spectrum system, the transmitted signal is spread over a frequency band that is wider than the minimum bandwidth required to transmit the information being sent. As a result of the signal spreading, spread spectrum systems have reduced susceptibility to interference or jamming, and enable high data integrity and security. Moreover, by spreading transmission power across a broad bandwidth, power levels at any given frequency within the bandwidth are significantly reduced, thereby reducing interference to other radio devices. In view of these significant advantages, spread spectrum communication systems are highly desirable for commercial data transmission.

In one type of spread spectrum communication system, a radio frequency (RF) carrier is modulated by a digital code sequence having a bit rate much higher than that of the information signal. These systems are known as "direct sequence" modulation systems. One example of a direct sequence spread spectrum system includes the RF carrier modulated by two data streams in quadrature with each one having one phase when the data stream code sequence represents a data "one" and 180° phase shift when the data stream code sequence represents a data "zero." This type of modulation is commonly referred to as Quadrature Phase Shift Key (QPSK) modulation.

The direct sequence spread spectrum radio receiver samples the received signal several times over the transmission time of each individual data bit. The discrete samples, referred to as "bins," are correlated with the original digital code sequence to identify "hits" or matches that represent valid data. The number of hits for a particular bin signal is referred to herein as its magnitude. The bin having the greatest magnitude is selected by the receiver as being most likely to contain reliable and valid data.

Since the received signals over several bit times will vary as a result of movement of the radio and/or objects within the transmission path, the number of hits for the respective bins will also vary in an unpredictable manner. The radio receiver will lock onto a particular bin as providing valid data, however, if there is a sudden drop in hits for that bin number due to multipath reflection, the bit synchronization logic may attempt to lock onto a different bin. This may increase the chance of data corruption if the different bin does not contain valid or reliable data, or may cause the receiver to detect a false bit or miss a bit entirely depending on the time delay of the received signal. To minimize false synchronization on multipath signals, the tracking threshold is normally set to a high level to mask the lower magnitude signals. While this cuts down on false synchronization, it further compromises the ability of the radio system to lock onto signals having low power levels.

Thus, it would be desirable to provide a radio receiver for direct sequence spread spectrum communications that minimizes false synchronization due to multipath interference yet is sensitive enough to lock onto low power signals. A radio receiver that utilizes all received multipath signals to minimize false synchronization would allow the tracking threshold to be lowered to obtain greater overall system sensitivity.

SUMMARY OF THE INVENTION

In accordance with the teachings of the present invention, a delay diversity processor for use in receiving direct sequence spread spectrum data is provided. The delay diversity processor utilizes the multipath signals to enhance bit synchronization performance by integrating the magnitude of each multipath signal to compensate for erratic fluctuations in the multipath signal. As a result, the receiver is less prone to sudden signal strength variation that might trigger erroneous bit resynchronization.

The delay diversity processor comprises a first circuit which determines a magnitude value for each of a plurality of correlated signal samples of individual data bits of plural data streams of the received spread spectrum data. A second circuit integrates each of the magnitude values with the corresponding sample bin of the preceding bits over a period of time corresponding to receipt of a plurality of data bits. The second circuit includes a negative feedback term so the resultant integrated values track the mean received signal response. The integrated magnitude values provide a measure of confidence of a particular one of the correlated signal samples with respect to remaining ones of the correlated signal samples. The correlated signal sample corresponding to the most consistently high measure of confidence is thus most likely to contain reliable and valid data.

More particularly, the first circuit determines a magnitude value by determining an absolute value measurement of the correlated signal samples for each of the plural data streams. The absolute value measurements of the plural data streams are summed together and synchronized to a sample rate of the individual data bits. The first circuit comprises at least one absolute value circuit, a first summing circuit and a latch circuit. The second circuit integrates the magnitude values by summing the summed absolute value measurements of corresponding ones of the signal samples with a feedback sum value and delaying the sum by a period corresponding to one data bit to provide the measure of confidence value. The measure of confidence value is decayed by a feedback decay constant to provide the feedback sum value. The second circuit comprises a second summing circuit, a digital delay circuit, and a decay circuit in a feedback loop to the second summing circuit.

In an embodiment of the delay diversity processor, the digital delay circuit of the second circuit provides for resetting of the integrated magnitude values within following interruption of receipt of the spread spectrum data. The digital delay circuit comprises a plurality of serially coupled flip-flop circuits that delay the measure of confidence by a period corresponding to one data bit. The data values within the flip-flop circuits can be reset either to zero, or to a predetermined value. The use of a predetermined value improves the ability of the delay diversity processor to generate valid data following an interruption of the spread spectrum data.

A more complete understanding of the methodology for received signal enhancement utilizing delay diversity processing will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a radio receiver for direct sequence spread spectrum communications that utilizes all the multipath signals to select the most consistently strong signal. A radio receiver constructed in accordance with this invention would enable the acquisition threshold of the receiver to be lowered in order to obtain greater overall system sensitivity than that of conventional radio receivers.

Figure 1:
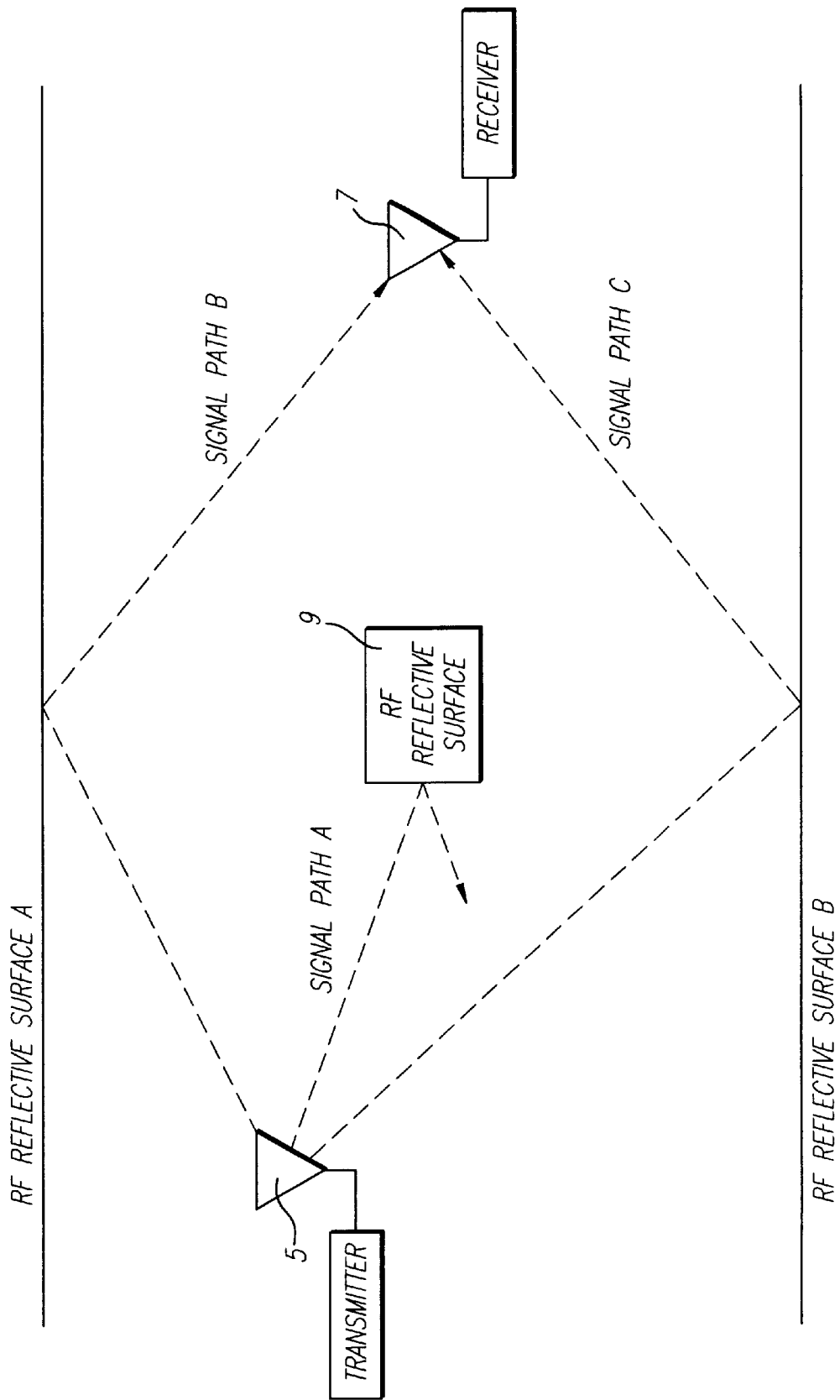
FIG. 1 illustrates the multipath transmission phenomenon for a radio signal travelling between a transmitter and a receiver.

Referring first to FIG. 1, the multipath transmission phenomenon is illustrated with respect to a transmitter and a receiver. A radio signal that is transmitted from the transmitter antenna 5 may follow any of a plurality of paths before being received by the receiver antenna 7. While FIG. 1 illustrates three such paths, including signal paths A, B and C, it should be apparent that a potentially infinite number of signal paths exist. Signal path A is a more direct path than either of paths B or C, however, an object 9 having an RF reflective surface blocks the transmission of the signal. Signals traveling along paths B and C are reflected off of the identical RF reflective surfaces A and B, respectively. Thus, the receiver receives the signals which have traveled along signal paths B and C, but not the signal which has traveled along path A. Moreover, the signals that traveled along signal paths B and C are slightly delayed in time relative to a signal taking the direct path A (assuming that the object 9 was not blocking the signal).

Ordinarily, a receiver will synchronize to the strongest signal, and neglect (or ignore) the other multipath signals. In FIG. 1, the distance along path B is shorter than that of path A, and as a result, the receiver is likely to lock onto the signal travelling on path B as it will be the strongest signal. Each reflection robs the signal of a portion of its power, and the longer distance traveled further degrades the quality of the signal. In practice, the transmitter, receiver and/or reflective surfaces may be in motion and the reflective surfaces will have different characteristics, further complicating the variations in the relative signal paths. For example, the transmitter may be mobile and continuously transmitting a signal to a stationary receiver within an indoor location having numerous reflective surfaces and moving objects. As the transmitter moves closer to the reflective surface B, the delay times between the respective signal paths and their relative strengths will change continuously until eventually the signal following path C will become stronger than the signal on path B. At that point, the receiver may shift synchronization to the signal received on signal path C. Similarly, path A may become the dominant signal as either the transmitter or the object 9 is moved.

Figure 2C:
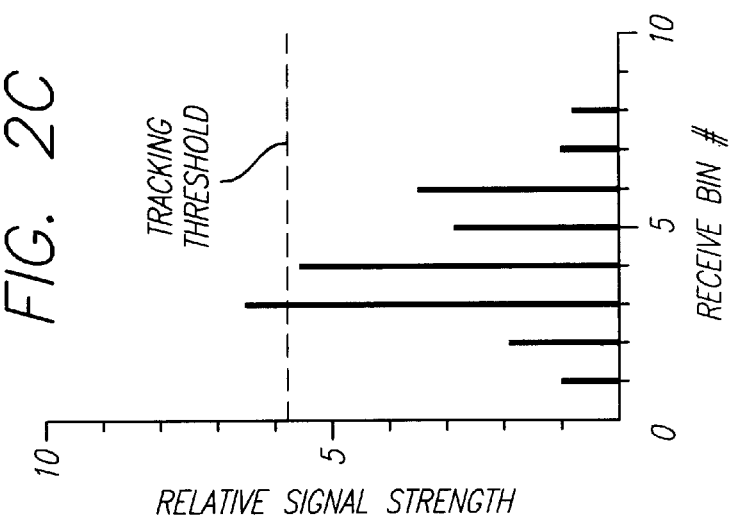
FIGS. 2A–2C are graphs representing the relative received bin magnitudes over several bit times.
Figure 2B:
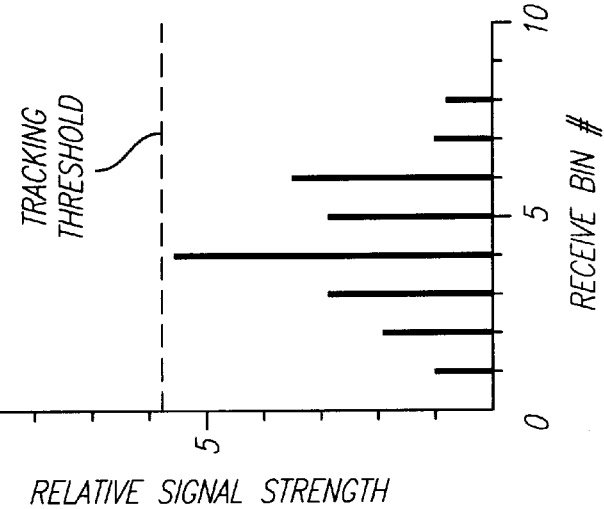
Figure 2A:
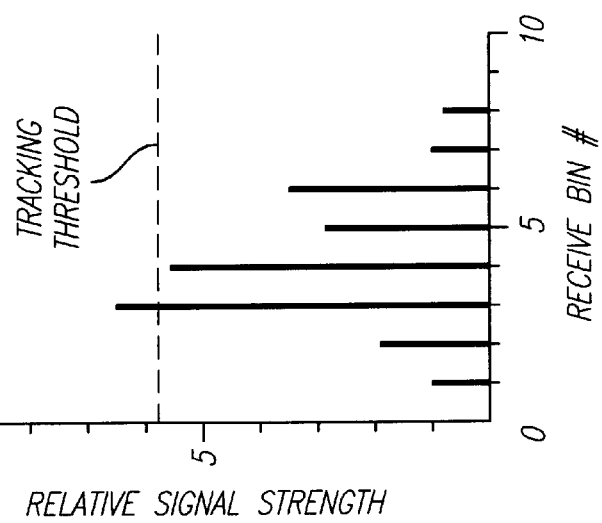

Referring now to FIGS. 2A–2C, the affect of the changing multipath environment on the received signal magnitude is illustrated. Each of the graphs represent the respective signal strength for a plurality of discrete samples, or bins, each corresponding to the transmitting of a single data bit of a direct sequence spread spectrum signal. The successive graphs represent changes to the signal at each of the bins over a period of time corresponding to the transmittal of several data bits. In FIG. 2A, the signal received at bin 3 has the highest relative magnitude, which would cause the receiver to lock onto bin 3 as most likely to have valid data. The magnitude of bin 3 exceeds a tracking threshold utilized by the receiver to mask low strength signals.

In FIG. 2B, however, the signal strength at bin 3 has dropped significantly, such as due to an object which has blocked or deflected the signal. Bin 4 now has the greatest relative signal strength, which may cause the radio receiver to switch synchronization to bin 4. This switch may result in the corruption of the data bit associated with that sample if the data present at bin 4 is not valid. It may also result in loss of the data altogether, since the signal at bin 4 is below the tracking threshold. Thereafter, as illustrated in FIG. 2C, the signal strength at bin 3 has again returned to a high level, but the radio receiver may be still locked onto bin 4 at this time which could result in loss of valid data at bin 3.

Figure 3:
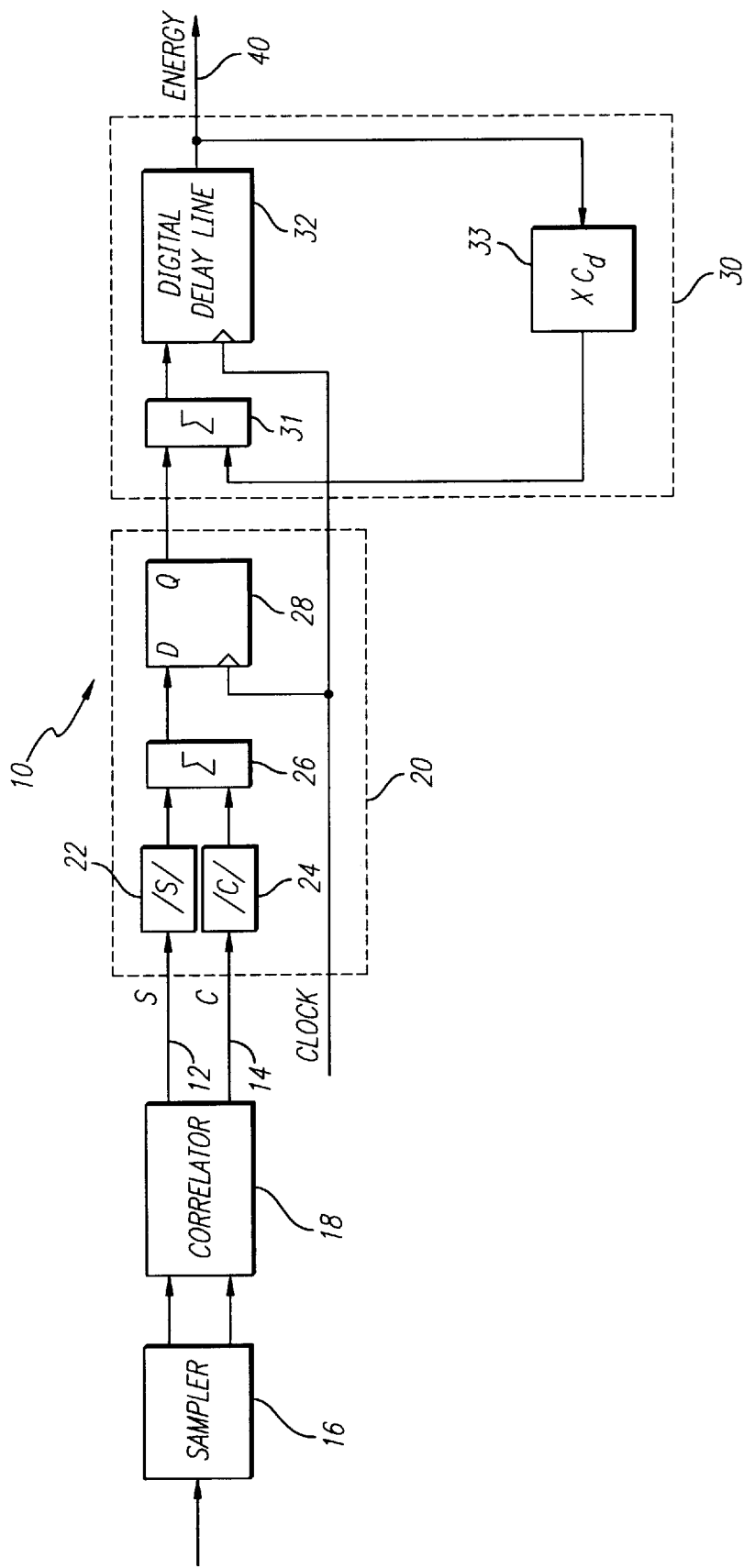
FIG. 3 is a block diagram illustrating the delay diversity processor of the present invention.

Referring now to FIG. 3, an example of a delay diversity processor 10 of the present invention is illustrated in block diagram form. The delay diversity processor 10 receives two correlated data inputs, termed S and C. The S and C correlated data inputs are transmitted in quadrature, such that the two inputs are 90° out of phase. Each of the S and C quadrature signals have been correlated by a digital matched filter 18, and the S and C inputs each comprise a binary value that corresponds to the number of hits, or correlations, with the digital code sequence utilized to modulate the data bits of the information signal. The correlated data inputs are sampled by a sampler 16 at a rate much higher than the data rate, with the discrete samples or bins appearing at the S and C inputs 12, 14.

The S and C correlated data inputs are first provided to a magnitude circuit 20 that comprises absolute value circuits 22, 24, a first summing circuit 26, and a latch circuit 28. The magnitude circuit 20 determines a vector magnitude value for each bin of the signal. The S and C data inputs 12, 14 are respectively coupled to the absolute value circuits 22, 24. Each of the S and C signals have a most significant bit representing the sign of the data. The absolute value circuits 22, 24 strip off the most significant bit to determine an absolute value for each bin signal. The absolute values are then mathematically summed by the summing circuit 26 which determines the vector magnitude value for each successive bin. The vector magnitude value is then provided to the latch circuit 28 which synchronizes the vector magnitude value to a clock. The clock operates at the sample rate of the bin data. The latch circuit 28 may be a conventional flip-flop circuit that is triggered by the clock signal so that the vector magnitude value provided to the D input will appear at the Q output with the receipt of a clock pulse.

The synchronized vector magnitude value is then coupled to an integrator circuit 30 comprising a second summing circuit 31, a delay line 32, and a decay circuit 33. The vector magnitude value provided by the magnitude circuit 20 is coupled to an input of the second summing circuit 31 along with a feedback signal, which will be described below. The output of the second summing circuit 31 is coupled to the delay line 32, which delays the sum value calculated by the second summing circuit 31 by a period of time equal to one data bit. The delay line 32 is also coupled to the clock, so that it triggers at the same rate that the vector magnitude value of the respective bins is calculated. An output 40 of the delay line 32 provides an energy measurement for the particular bin, which will also be described below. The output 40 is also coupled to the decay circuit 33, that reduces the magnitude of the output 40 from the delay line 32. The decay circuit 33 divides the output 40 by a constant $C_d$. The output of the decay circuit 33 is then coupled to the second input of the second summing circuit 31.

The operation of the delay diversity processor 10 of FIG. 3 will now be described with reference to the examples of bin data described above with respect to FIGS. 2A–2C. As noted, a plurality of bin signals are provided to the delay diversity processor 10 at the S and C inputs for each successive data bit. The relative signal strength measurements of FIGS. 2A–2C correspond to the magnitude for each bin determined by the magnitude circuit 20. The integrator circuit 30 calculates a running total for each bin, by adding the current bin value with the previous total for that particular bin. The decay circuit 33 causes the integrated sums to follow the long term (over several bit times) trend of the relative signal magnitudes detected in each bin. This integration with delay thus acts as a smoothing function on the bin samples causing short term magnitude fluctuations to have little to no effect on bit synchronization.

This methodology smoothes sudden changes in each of the multipath signal's received magnitude to compensate for instantaneous degradation to the multipath signal. By tracking the resulting integrated magnitudes, the received energy value will be less prone to sudden erroneous changes that would trigger resynchronization or cause data corruption. Instead, a true change in received signal strength will allow a smooth change of synchronization to a new signal path as receive conditions change. The delay diversity processor improves radio system performance by allowing the tracking thresholds to be set to lower levels to increase receiver sensitivity. The energy value provides a peak corresponding to the higher magnitude received signal while the decay constant allows the signal magnitudes associated with noise to decay to low values. Thus, the lower tracking threshold allows true signals with a lower magnitude to be detected.

Notwithstanding the significant improvement in radio system performance provided by the delay diversity processor 10, in certain usages it may be necessary to purge old data from the delay line 32 in order to prevent errors caused by intermittent radio system usage. As long as a radio system remains in a receive mode, the integrated sums of the bin sample values will decay naturally in the absence of correlated signals by operation of the decay circuit 33 described above. In certain radio systems, however, the radio does not operate in a continuous receive mode. Instead, for example, a radio system may operate in a half-duplex burst mode in which the receiver is not active while the radio is in a transmit mode. Alternatively, the radio may be turned on for only short periods of time for power conservation purposes. When the radio system is powered "off" then back "on", historical data from the previous "on/off" cycle would remain in the digital delay line 32. Proper data tracking for the next "on" period is delayed until the impact of the old data has been completely removed via the decay circuit 33, at which time the new data dominates the values in the decay circuit. In some situations, this delay in tracking synchronization could undesirably increase the response time of the radio system.

Figure 4:
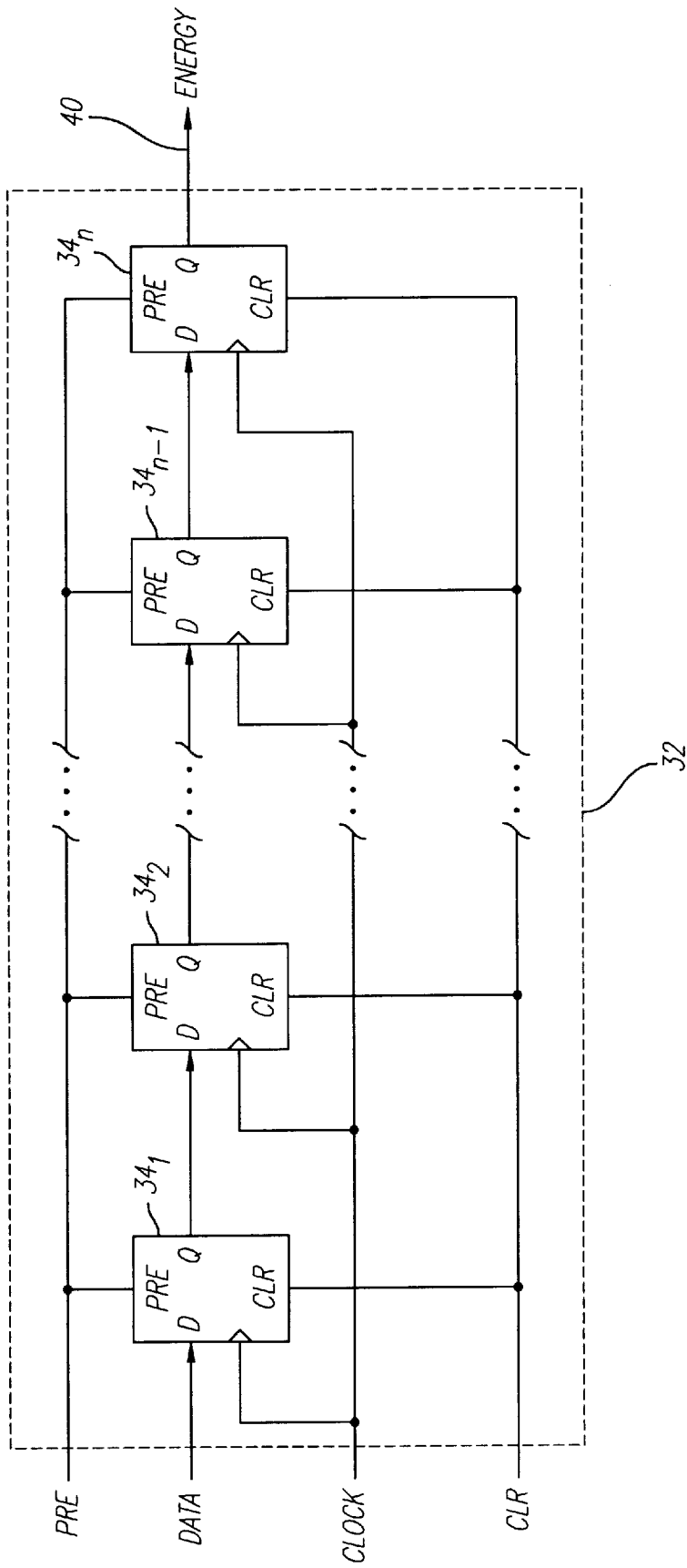
FIG. 4 is a schematic illustration of an embodiment of the digital delay line of the delay diversity processor of FIG. 3.

Referring now to FIG. 4, an embodiment of the delay line 32 directed to this particular problem is illustrated. The delay line 32 comprises a plurality of settable/resettable flip-flop circuits $34_{1-n}$ in which n equals the number of bins utilized to transmit a single bit of data. Each one of the flip-flop circuits $34_{1-n}$ are coupled together in a chained arrangement, with the Q output of each flip-flop coupled to the D input of each successive circuit. The flip-flop circuits $34_{1-n}$ further include a clock input (CLK), a clear input (CLR), and a preset (PRE) input. As known in the art, a flip-flop circuit will temporarily latch a binary data value that is applied to the respective D input. A clock pulse applied to the CLK input causes the flip-flop circuit to output the binary data value at the Q output, and to latch in the next data value at the D input. The CLR input resets the stored data value within the flip-flop circuit to all zeros. The PRE input allows a predetermined binary data value to be loaded into the flip-flop instead of the data value at the D input.

With the radio system operating in a continuous receive mode, the data values will cascade through the delay line 32 with each successive clock pulse, in the manner described above. Upon interruption of receive mode operation, the data values stored within the flip-flop circuits $34_{1-n}$ can be purged by resetting the values to zero by application of the CLR signal, or can be set to a predetermined value by application of the PRE signal. While clearing the data back to a zero state will eliminate false "hits" due to pre-existing historical data, the ramp up time of the delay line 32 from the zero state requires several bit periods. By selecting the proper value to be preset into the flip-flop circuits $34_{1-n}$, detection of valid data can occur within a few bit periods while the decay circuit 33 drives out values that do not correspond to valid data. As a result, the inherent delays of the delay diversity circuit can be balanced against the need for fast acquisition of signals necessary to improve overall system performance. The particular value that is loaded into the flip-flop circuits $34_{1-n}$ by the PRE signal can either be a fixed predetermined value, or can be adaptively generated by consideration of historical data.

It should be apparent that the circuit elements described above can be implemented with conventional digital logic, or alternatively, can be implemented in software and executed by a microprocessor. The magnitude values described above are for exemplary purposes only, and may not be consistent with actual data values. The constant value $C_d$ is in a range between 0 and 1, and is selected based upon the desired response time of the output of the integrator circuit 30 to changes of input magnitudes. As the value of $C_d$ increases toward unity, the response of the output to input changes is slowed. Conversely, decreasing the value of $C_d$ toward 0 will decrease the response time of the integrator circuit 30 to changes in the input signal.

Having thus described a preferred embodiment of a radio receiver having signal enhancement by use of delay diversity processing, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A delay diversity processor for use in receiving direct sequence spread spectrum data comprising individual data bits of a data signal modulated by a multi-bit spreading code, the processor comprising:

means for sampling said individual data bits of said data signal to provide a plurality of signal samples for each one of said individual data bits;

means for correlating each one of said plurality of signal samples with a corresponding one of plural bins of said multi-bit spreading code to yield a plurality of correlated signal samples for each one of said individual data bits, wherein plural successive ones of said correlated signal samples correspond to one of said individual data bits in which some of said plural successive ones of said correlated signal samples represent false data and others of said plural successive ones of said correlated signal samples represent valid data;

means for determining a magnitude value for each respective one of said plurality of correlated signal samples, each said magnitude value representing received signal strength only during a time slot corresponding to a respective one of said plural bins of said multi-bit spreading code, said determining means thereby providing plural magnitude values representing said plural bins for each one of said individual data bits;

means for integrating said magnitude values over a period of time corresponding to receipt of a plurality of successive ones of said individual data bits to provide integrated magnitude values for each corresponding one of said magnitude values, each one of said integrated magnitude values representing received signal strength corresponding to a respective one of said plural bins of said multi-bit spreading code integrated over successive bit times, said integrating means thereby providing a separate integrated magnitude value for each one of said plural bins, said integrated magnitude values providing a measure of confidence indicating at least one of said plural successive ones of said correlated signal samples corresponding to at least one of said plural bins that likely represents valid data; and means for resetting each one of said integrated magnitude values within said integrating means in response to a signal provided following interruption of receipt of said direct sequence spread spectrum data.

2. The delay diversity processor of claim 1, wherein said means for integrating each of said magnitude values further comprises means for delaying said measure of confidence by a period corresponding to one data bit.

3. The delay diversity processor of claim 2, wherein said delaying means further comprises a plurality of serially coupled flip-flop circuits.

4. The delay diversity processor of claim 1, wherein said resetting means further comprises means for clearing said integrated values to zero.

5. The delay diversity processor of claim 1, wherein said resetting means further comprises means for resetting said integrated values to a predetermined value.

6. The delay diversity processor of claim 1, wherein said means for determining magnitude values further comprises means for determining respective absolute value measurements of said correlated signal samples.

7. The delay diversity processor of claim 6, wherein said means for determining absolute value measurements further comprises an absolute value circuit having an input coupled to receive said correlated signal samples for said at least one data stream.

8. The delay diversity processor of claim 6, wherein said means for determining magnitude values further comprises means for summing each one of said absolute value measurements of said at least one data stream.

9. The delay diversity processor of claim 8, wherein said means for summing comprises a summing circuit having an output providing a summed absolute value measurement of said correlated signal samples.

10. The delay diversity processor of claim 8, wherein said means for determining magnitude values further comprises means for synchronizing said summed absolute value measurements to a sample rate of said individual data bits.

11. The delay diversity processor of claim 10, wherein said means for synchronizing further comprises a clock driven latch circuit.

12. A delay diversity processor for use in receiving direct sequence spread spectrum data comprising individual data bits of a data signal modulated by a multi-bit spreading code, the processor comprising:

means for sampling said individual data bits of said data signal to provide a plurality of signal samples for each one of said individual data bits;

means for correlating each one of said plurality of signal samples with a corresponding one of plural bins of said multi-bit spreading code to yield a plurality of correlated signal samples for each one of said individual data bits, wherein plural successive ones of said correlated signal samples correspond to one of said individual data bits in which some of said plural successive ones of said correlated signal samples represent false data and others of said plural successive ones of said correlated signal samples represent valid data;

means for determining a magnitude value for each respective one of said plurality of correlated signal samples, each said magnitude value representing received signal strength only during a time slot corresponding to a respective one of said plural bins of said multi-bit spreading code, said determining means thereby providing plural magnitude values representing said plural bins for each one of said individual data bits;

means for integrating each one of said magnitude values over a period of time corresponding to receipt of a plurality of said individual data bits to provide respective integrated magnitude values, each one of said integrated magnitude values representing received signal strength corresponding to a respective one of said plural bins of said multi-bit spreading code integrated over successive bit times, said integrating means thereby providing a separate integrated magnitude value for each one of said plural bins, said integrated magnitude values providing a measure of confidence of a particular one of said plurality of correlated signal samples corresponding to one of said plural bins relative to remaining ones of said plurality of correlated signal samples; and means for resetting said integrated magnitude values within said integrating means in response to a reset signal provided following interruption of receipt of said direct sequence spread spectrum data;

wherein said means for determining a magnitude value comprises means for determining a respective absolute value measurement of each one said plurality of correlated signal samples, means for summing plural absolute value measurements to provided summed absolute value measurements, and means for synchronizing said summed absolute value measurements to a sample rate of said individual data bits; and wherein said means for integrating each of said magnitude values comprises means for summing said summed absolute value measurements of corresponding ones of said plurality of correlated signal samples with a feedback sum value to provide said measure of confidence.

13. The delay diversity processor of claim 12, wherein said means for summing said summed absolute value measurements comprises a summing circuit having a first input coupled to receive said summed absolute value measurements and a second input coupled to receive said feedback sum value, said summing circuit having an output providing a sum of said summed absolute value measurements and said feedback sum value.

14. The delay diversity processor of claim 12, wherein said means for integrating each of said magnitude values comprises means for delaying said measure of confidence by a period corresponding to one data bit to provide said feedback sum value.

15. The delay diversity processor of claim 14, wherein said means for delaying comprises a delay circuit synchronized to said sample rate and having an input coupled to said output of said means for summing said summed absolute value measurements.

16. The delay diversity processor of claim 14, wherein said means for integrating each of said magnitude values comprises means for decaying said feedback sum value by a feedback decay constant.

17. The delay diversity processor of claim 16, wherein said means for decaying comprises a decay circuit having an input coupled to an output of said means for delaying and an output coupled to said second input of said means for summing said summed absolute value measurements.

18. A delay diversity processor for use in receiving direct sequence spread spectrum data comprising individual data bits of a data signal modulated by a multi-bit spreading code, the processor comprising:

means for sampling said individual data bits of said data signal to provide a plurality of signal samples for each one of said individual data bits;

means for correlating each one of said plurality of signal samples with a corresponding one of plural bins of said multi-bit spreading code to yield a plurality of correlated signal samples for each one of said individual data bits, wherein plural successive ones of said correlated signal samples correspond to one of said individual data bits in which some of said plural successive ones of said correlated signal samples represent false data and others of said plural successive ones of said correlated signal samples represent valid data;

means for determining a magnitude value for each respective one of said plurality of correlated signal samples of individual data bits of at least one data stream of said received direct sequence spread spectrum data, each said magnitude value representing received signal strength only during a time slot corresponding to a respective one of said plural bins of said multi-bit spreading code, said determining means thereby providing plural magnitude values representing said plural bins for each one of said individual data bits;

means for integrating each of said magnitude values over a period of time corresponding to receipt of a plurality of said individual data bits to provide integrated magnitude values, each one of said integrated magnitude values representing received signal strength corresponding to a respective one of said plural bins of said multi-bit spreading code integrated over successive bit times, said integrating means thereby providing a separate integrated magnitude value for each one of said plural bins, said integrated magnitude values providing a measure of confidence of a particular one of said plurality of correlated signal samples relative to remaining ones of said plurality of correlated signal samples; and means for resetting said integrated magnitude values within said integrating means in response to a reset signal provided following interruption of receipt of said direct sequence spread spectrum data;

wherein said means for integrating each of said magnitude values further comprises means for summing said plural magnitude values corresponding to each of said plurality of correlated signal samples with a feedback sum value to provide said measure of confidence.

19. The delay diversity processor of claim 18, wherein said means for summing said magnitude values comprises a summing circuit having a first input coupled to receive said magnitude values and a second input coupled to receive said feedback sum value, said summing circuit having an output providing a sum of said magnitude values and said feedback sum value.

20. The delay diversity processor of claim 19, wherein said means for integrating each of said magnitude values further comprises means for delaying said measure of confidence by a period corresponding to one data bit to provide said feedback sum value.

21. The delay diversity processor of claim 19, wherein said means for delaying further comprises a delay circuit synchronized to a sample rate of said individual data bits of said data signal and having an input coupled to said output of said means for summing said summed absolute value measurements.

22. The delay diversity processor of claim 19, wherein said means for integrating each of said magnitude values further comprises means for decaying said feedback sum value by a feedback decay constant.

23. The delay diversity processor of claim 22, wherein said means for decaying further comprises a decay circuit having an input coupled to an output of said means for delaying and an output coupled to said second input of said means for summing said summed absolute value measurements.

24. A delay diversity processor for use in receiving direct sequence spread spectrum data comprising individual data bits of a data signal modulated by a multi-bit spreading code, the processor comprising:

means for sampling said individual data bits of said data signal to provide a plurality of signal samples for each one of said individual data bits;

means for correlating each one of said plurality of signal samples with a corresponding one of plural bins of said multi-bit spreading code to yield a plurality of correlated signal samples for each one of said individual data bits, wherein plural successive ones of said correlated signal samples correspond to one of said individual data bits in which some of said plural successive ones of said correlated signal samples represent false data and others of said plural successive ones of said correlated signal samples represent valid data;

means for determining a magnitude value for each respective one of said plurality of correlated signal samples, each said magnitude value representing received signal strength only during a time slot corresponding to a respective one of said plural bins of said multi-bit spreading code said determining means thereby providing plural magnitude values representing said plural bins for each one of said individual data bits; and means for integrating said magnitude values over a period of time corresponding to receipt of a plurality of successive ones of said individual data bits to provide integrated magnitude values for each corresponding one of said magnitude values, each one of said integrated magnitude values representing received signal strength corresponding to a respective one of said plural bins of said multi-bit spreading code integrated over successive bit times, said integrating means thereby providing a separate integrated magnitude value for each one of said plural bins, said integrated magnitude values providing a measure of confidence indicating at least one of said plural successive ones of said correlated signal samples that likely represents valid data.

25. The delay diversity processor of claim 24, wherein said means for determining magnitude values comprises means for determining an absolute value measurement of said plurality of correlated signal samples.

26. The delay diversity processor of claim 24, further comprising means for resetting said integrated magnitude values within said integrating means in response to a reset signal provided following interruption of receipt of said direct sequence spread spectrum data.

27. A delay diversity processor for use in receiving direct sequence spread spectrum data comprising individual data bits of a data signal modulated by a multi-bit spreading code, the processor comprising:

means for sampling said individual data bits of said data signal to provide a plurality of signal samples for each one of said individual data bits;

means for correlating each one of said plurality of signal samples with a corresponding one of plural bins of said multi-bit spreading code to yield a plurality of correlated signal samples for each one of said individual data bits, wherein plural successive ones of said correlated signal samples correspond to one of said individual data bits in which some of said plural successive ones of said correlated signal samples represent false data and others of said plural successive ones of said correlated signal samples represent valid data;

means for determining a magnitude value for each respective one of said plurality of correlated signal samples, each said magnitude value representing received signal strength only during a time slot corresponding to a respective one of said plural bins of said multi-bit spreading code, said determining means thereby providing plural magnitude values representing said plural bins for each one of said individual data bits; and means for integrating said magnitude values over a period of time corresponding to receipt of a plurality of said individual data bits to provide integrated magnitude values for each corresponding one of said magnitude values, each one of said integrated magnitude values representing received signal strength corresponding to a respective one of said plural bins of said multi-bit spreading code integrated over successive bit times, said integrating means thereby providing a separate integrated magnitude value for each one of said plural bins, said integrated magnitude values providing a measure of confidence of a corresponding one of said plurality of correlated signal samples relative to remaining ones of said plurality of correlated signal samples, wherein said means for integrating each of said magnitude values further comprises means for summing said magnitude values corresponding to each one of said plurality of correlated signal samples with a feedback sum value to provide said measure of confidence.

28. A method for distinguishing valid data within a direct sequence spread spectrum communication system in which individual data bits of a data signal are modulated by a multi-bit spreading code, and in which at least one data stream of received signal samples of individual data bits is correlated with a digital code sequence to provide a plurality of correlated signal samples, wherein plural successive ones of said plurality of correlated signal samples correspond to one of said individual data bits in which some of said plural successive ones of said plurality of correlated signal samples represent false data and others of said plural successive ones of said plurality of correlated signal samples represent valid data, the method comprising the steps of:

determining a magnitude value for each respective one of said plurality of said correlated signal samples, each said magnitude value representing received signal strength only during a time slot corresponding to a respective one of plural bins of said multi-bit spreading code, said determining means thereby providing plural magnitude values representing said plural bins for each one of said individual data bits; and integrating said magnitude values over a period of time corresponding to receipt of a plurality of successive ones of said individual data bits to provide integrated magnitude values for each corresponding one of said magnitude values, each one of said integrated magnitude values representing received signal strength corresponding to a respective one of said plural bins of said multi-bit spreading code integrated over successive bit times, said integrating means thereby providing a separate integrated magnitude value for each one of said plural bins, said integrated magnitude values providing a measure of confidence indicating at least one of said plural successive ones of said plurality of correlated signal samples that likely represents valid data.

29. The method of claim 28, wherein said step of determining magnitude values comprises determining an absolute value measurement of said plurality of correlated signal samples for said at least one data stream.

30. The method of claim 28, further comprising the step of resetting said integrated magnitude values in response to a reset signal provided following an interruption of receipt of said direct sequence spread spectrum data.

31. A method for distinguishing valid data within a direct sequence spread spectrum communication system in which at least one data stream of received signal samples of individual data bits is correlated with a digital code sequence to provide a plurality of correlated signal samples, comprising the steps of:

determining a magnitude value for each respective one of said plurality of correlated signal samples, each said magnitude value representing received signal strength only during a time slot corresponding to a respective one of plural bins of said multi-bit spreading code, said determining means thereby providing plural magnitude values representing said plural bins for each one of said individual data bits; and integrating said magnitude values over a period of time corresponding to receipt of a plurality of said individual data bits to provide integrated magnitude values for each corresponding one of said magnitude values, each one of said integrated magnitude values representing received signal strength corresponding to a respective one of said plural bins of said multi-bit spreading code integrated over successive bit times, said integrating means thereby providing a separate integrated magnitude value for each one of said plural bins, said integrated magnitude values providing a measure of confidence of a corresponding one of said plurality of correlated signal samples relative to remaining ones of said plurality of correlated signal samples, wherein said step of integrating each of one said magnitude values comprises summing said magnitude values corresponding to each one of said plurality of correlated signal samples with a feedback sum value to provide said measure of confidence.

32. A delay diversity processor for use in receiving direct sequence spread spectrum data comprising individual data bits of a data signal modulated by a multi-bit spreading code, the processor comprising:

a magnitude measuring device receiving at least one data stream of said received direct sequence spread spectrum data and providing a magnitude value for each respective one of a plurality of correlated samples of said received direct sequence spread spectrum data, wherein plural successive ones of said plurality of correlated signal samples collectively correspond to one of said individual data bits in which some of said plural successive ones of said plurality of correlated signal samples represent false data and others of said plural successive ones of said correlated signal samples represent valid data, each said magnitude value representing received signal strength only during a time slot corresponding to a respective one of plural bins of said multi-bit spreading code, said magnitude measuring device thereby providing plural magnitude values representing said plural bins for each one of said individual data bits; and an integrating device receiving each of said magnitude values over a period of time corresponding to receipt of a plurality of successive ones of said individual data bits to provide integrated magnitude values for each corresponding one of said magnitude values, each one of said integrated magnitude values representing received signal strength corresponding to a respective one of said plural bins of said multi-bit spreading code integrated over successive bit times, said integrating means thereby providing a separate integrated magnitude value for each one of said plural bins, said integrated magnitude values providing a measure of confidence indicating at least one of said plural successive ones of said plurality of correlated signal samples that likely represents valid data.

33. The delay diversity processor of claim 32, wherein a number of said plural successive ones of said correlated signal samples further correspond to a number of bits of said multi-bit spreading code.

34. The delay diversity processor of claim 32, further comprising a resetting device to reset said integrated magnitude values to a predetermined value in response to a reset signal provided following interruption of receipt of said direct sequence spread spectrum data.

* * * * *